United States Patent
Snowwhite

(12) 
(10) Patent No.: US 6,323,255 B1
(45) Date of Patent: Nov. 27, 2001

(54) RADIATION-CURABLE COMPOSITION

(75) Inventor: Paul E. Snowwhite, South Elgin, IL (US)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/163,188

(22) Filed: Sep. 30, 1998

(51) Int. Cl.⁷ .................................................. C08F 2/50
(52) U.S. Cl. .................. 522/120; 522/96; 522/113; 522/114; 522/182; 522/77; 522/127; 428/425.6; 428/423.1; 428/378
(58) Field of Search .................. 522/96, 113, 114, 522/119, 120, 121, 182, 74, 77, 127; 428/378, 391, 423.1, 425.6

(56) References Cited

U.S. PATENT DOCUMENTS

| | | |
|---|---|---|
| 5,498,751 | 3/1996 | Trapasso et al. . |
| 5,554,785 | 9/1996 | Trapasso et al. . |
| 5,587,453 * | 12/1996 | Abe et al. .......................... 528/488 |
| 5,606,103 | 2/1997 | Trapasso et al. . |

FOREIGN PATENT DOCUMENTS

| | | |
|---|---|---|
| WO 96/11217 | 4/1996 | (WO) . |
| WO 97/16469 | 5/1997 | (WO) . |
| WO 98/37030 | 8/1998 | (WO) . |
| WO 98/39264 | 9/1998 | (WO) . |
| WO 98/41483 | 9/1998 | (WO) . |

* cited by examiner

*Primary Examiner*—James J. Seidleck
*Assistant Examiner*—Sanza McClendon
(74) *Attorney, Agent, or Firm*—Pillsbury Winthrop LLP

(57) ABSTRACT

The present invention relates to radiation-curable compositions that after cure provide reduced discoloration, or reduced color degradation, and/or high elongation while maintaining other desirable qualities of radiation-cured compositions. These radiation-curable compositions include at least one radiation-curable oligomer and at least one transesterified and/or high-purity monomer. These compositions can be formulated, for example, to serve as protective coatings for substrates manufactured from a wide variety of including glass, plastic, ceramic, metal and wood. The compositions of the present invention are preferably designed for use as an optical fiber coating (including inner primary and, colored or uncolored, outer primary coatings as well as other coatings which include inks, matrix materials and the like) or related optical fiber protective materials.

19 Claims, 2 Drawing Sheets

RADIATION-CURABLE COMPOSITION

FIELD OF THE INVENTION

The present invention relates to radiation-curable compositions, their uses and preparations, which upon cure exhibit reduced discoloration over time and/or high elongation. In particular, the color stable and/or high elongation compositions of the present invention comprise at least one transesterified and/or high-purity monomer. These compositions are adaptable for a variety of uses including, for example, coatings on fiber optics and/or coatings which form part of fiber optic cable assemblies such as: primary, colored or uncolored outer primary coatings as well as other coatings including inks and matrix materials.

BACKGROUND OF THE INVENTION

Radiation-curable compositions are extensively used in the optical fiber industry during the production of optical fibers and cables. Optical fibers are routinely coated with at least one radiation-curable composition typically immediately after the optical fiber is manufactured in a draw tower so as to preserve the pristine character of the optical fiber. Immediately after the coating is applied to the fiber, the coating can be rapidly cured by exposure to radiation (commonly ultraviolet light). Radiation-curable composition may also be used as matrix materials to bundle together individual coated optical fibers into ribbons, optical fiber cables, and similar assemblies.

For purposes of multi-channel transmission, optical fiber assemblies containing a plurality of coated optical fibers have been used. Optical fiber assemblies provide a modular design which simplifies the installation and maintenance of optical fibers by eliminating the need to handle individual optical fibers. Examples of optical fiber assemblies include ribbon assemblies and cables. A typical optical fiber assembly is made of a plurality of coated optical fibers which are bonded together in a matrix material. For example, the matrix material can encase the optical fibers, or the matrix material can edge-bond the optical fibers together.

Coated optical fibers for use in optical fiber assemblies are usually coated with an outer colored layer, called an ink coating, or alternatively a colorant is added to the outer primary coating to facilitate identification of the individual coated optical glass fibers. Such ink coatings and colored outer primary coatings are well known in the art. Thus, the matrix material which binds the coated optical fibers together contacts the outer ink layer if present, or the colored outer primary coating.

Because a variety of competing characteristics are desired in optical fiber coating systems, multiple layers of coatings are routinely employed in optical fiber production. These typically include a soft inner primary coating and a tougher outer primary coating which provides a more durable exterior for the optical fiber. The outer primary coating may be uncolored (i.e., colorless) or include color which offers an identifier when coated onto an optical fiber. Examples of radiation-curable primary coatings are disclosed in U.S. Pat. No. 5,336,563 to Coady et al. the entire disclosure of which is hereby incorporated by reference. Additional aspects of optical fiber coating technology are disclosed in U.S. Pat. Nos. 5,199,098 to Nolan et al.; 4,923,915 to Urruti et al.; 4,720,529 to Kimura et al.; and 4,474,830 to Taylor et al.

A common type of radiation-curable composition include those having urethane-containing oligomers. Although such compositions are widely used, they suffer from photo-induced discoloration (more specifically, yellowing). The industry increasingly demands coatings, which are colorless or at least substantially colorless and will remain virtually colorless over time. Coatings with color stability, or colorless stability, serve an important function because they suggest a lack of coating degradation over time. More importantly, coated optical fibers are typically color-coded, and yellowing in a given coating can change or mask the color of the coated optical fiber. This presents problems, inter alia, when, for example, a worker in the field needs to repair or work on the optical fiber cable and, due to a color change of the coating over time, is unable to identify the desired fiber. Accordingly, there is a need for radiation-curable compositions which may be adapted for use as an inner primary and/or outer primary fiber optic coating as well as an ink, matrix material and the like that virtually does not discolor over time. There is also a need for colored coatings (which include colorless coatings mixed with colorants) to have the same reduced color degradation qualities.

U.S. Pat. Nos. 5,498,751, 5,554,785 and 5,606,103 to Trapasso et al., the entire disclosures of each are herein incorporated by reference, disclose monomers synthesized by transesterification, for example, isodecylacrylate. These monomers have excellent purity which means these monomers have low to no impurities such as color bodies that attribute to the lower color of these monomers. However, there is no disclosure in these patents that such monomers could be useful in fiber optic coating compositions or that they provide any effect in reducing discoloration or color degradation in cured radiation-curable compositions. In addition, there is no discussion in these patents that such monomers could provide a substantial increase in the elongation capabilities of cured radiation-curable composition.

SUMMARY OF THE INVENTION

The present invention provides radiation-curable compositions, uses and preparation thereof, that after cure provide reduced discoloration, or reduced color degradation, and/or high elongation while maintaining other desirable qualities of radiation-cured compositions. These radiation-curable compositions comprise at least one radiation-curable oligomer and at least one transesterified and/or high-purity monomer diluent. These radiation-curable compositions can be adapted to serve a variety of purposes. For example, these composition can be formulated to serve as protective coatings for substrates manufactured from a wide variety of materials to include, for example, glass, plastic, ceramic, metal and wood. The compositions of the present invention are preferably designed for use as an optical fiber coating (including primary and, colored or uncolored, outer primary coatings as well as other coatings which include inks, matrix materials and the like) or related optical fiber protective materials. Such optical fiber coatings have their own set of unique performance requirements, which distinguish them from conventional applications.

DETAILED DESCRIPTION OF THE PRESENT INVENTION

Figure 1:
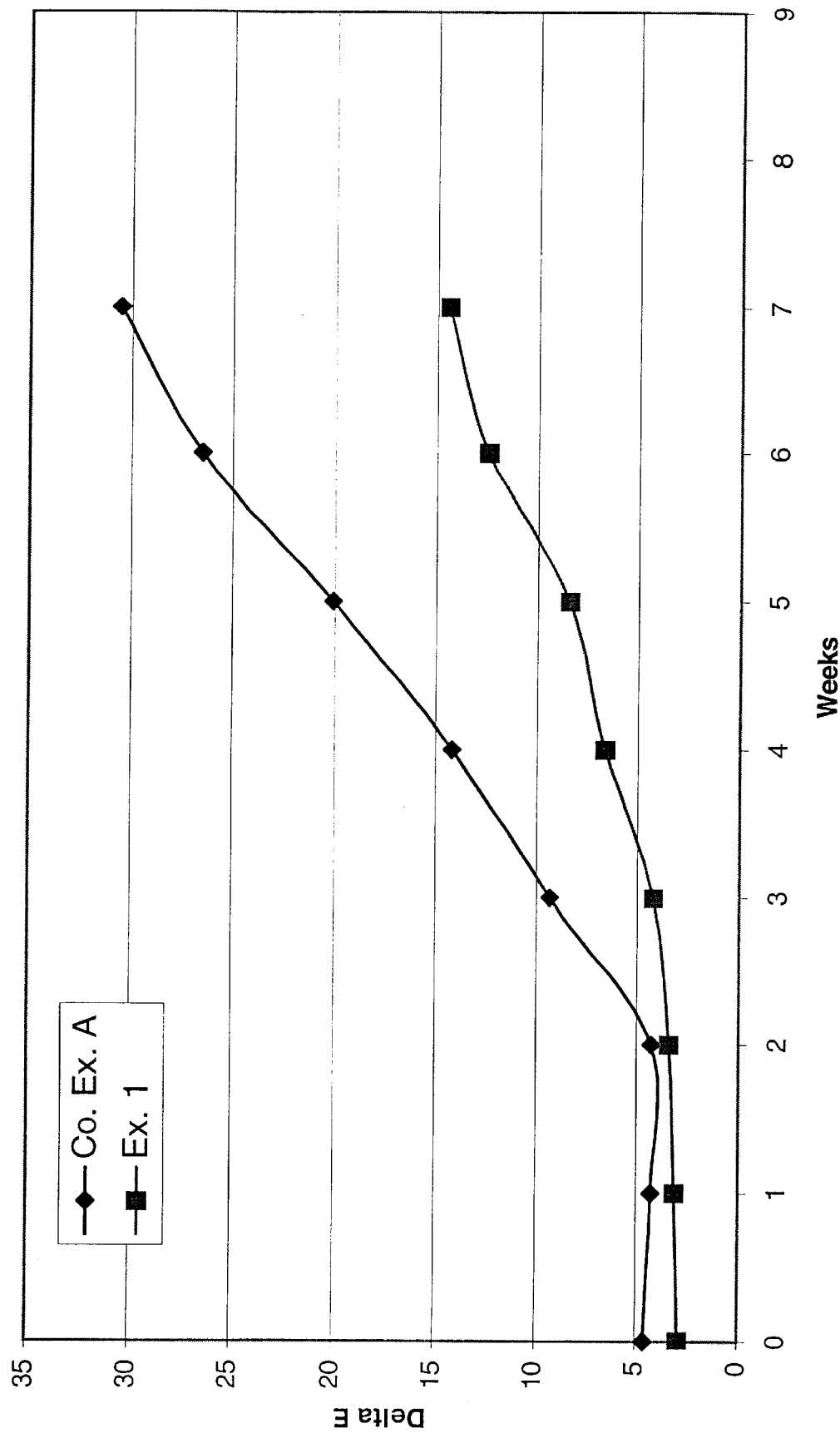
FIG. 1 depicts a comparison of $\Delta E$ values for Example 1 and Comparative Example A over a 7 week period.

The radiation-curable compositions of the present invention are not particularly limited by how they are prepared.

Any conventional process and equipment suitable for this purpose may be employed. Blends of oligomers, monomer diluents, and other ingredients can be used to tailor properties by conventional means.

A key characteristic of the present invention is the ability to formulate compositions that, upon cure, exhibit a substantial decrease of light discoloration, or color degradation, and/or improved elongation as compared to conventional radiation-curable compositions. It is believed that this results from the inclusion of at least one transesterified and/or high-purity monomer diluent in the pre-mixture ingredients of the radiation-curable composition of the present invention. For this invention, "pre-mixture" refers to the identity of a particular ingredient at a point prior to its introduction (and possible interaction or reaction) with other ingredients in the composition. The present invention also provides colored compositions that exhibit reduced color change over time. In the examples, the reduction of color change is observed during aging of substantially colorless materials. However, prevention of color change according to this invention is by no means limited to colorless materials. A substantially colorless composition as described herein comprising at least one transesterified and/or high-purity monomer may also include a colorant like a pigment and/or dye. Mixtures of colorants can be used.

The radiation-curable compositions of the present invention are now described in more detail.

(A) Radiation-curable Oligomer

The radiation-curable oligomer useful in the radiation-curable compositions is a compound (hereinafter "oligomei" or "oligomer compound"), typically polymeric, composed of one or more types of polymers having urethane bonds in a molecular chain such that the oligomer compound, or mixture of such oligomer compounds, have on average 1.2 or more polymerizable, preferably from 1.2 to 4, and more preferably from 1.5 to 2.5, unsaturated groups per oligomer compound. The polymerizable unsaturated group preferably includes radically polymerizable ethylenically unsaturated groups, for example, (meth)acrylate, vinyl ether, vinyl, acrylamide, maleate, fumarate, and the like. The preferred ethylenically unsaturated groups are (meth)acrylate, with acrylate groups being most preferred.

Useful oligomers include those which contain two or more urethane bonds, and preferably 2–10 urethane bonds. If the number of urethane bonds is less than two, the tenacity of the resulting cured product decreases, which tends to produce a transmission loss of optical fiber when the composition is used as a coating material for optical fibers.

The principal chain, or backbone, of suitable oligomers include those constituted of a wide variety of polymers including those derived from polyether polyols, polyester polyols, polycaprolactone polyols, polyolefin (hydrocarbon) polyols, polycarbonate polyols and the like. These polyols may be used either singly or in combinations of two or more and linked by variety of means including urethane linkages. It is especially desirable that the component (A) contains a polyether urethane-based oligomer including, in particular, those comprising polycarbonate- and polyether- groups. In this case, either all or a part of the component (A) may be a polyether urethane-based oligomer.

The oligomers useful as the component (A), include those composed of a polyether urethane-based polymer as a basic structure, produced by reacting (a) a polyether polyol (hereinafter called "polyether polyol (a)") obtained by a ring-opening reaction of an alkylene oxide, (b) a polyisocyanate (hereinafter called "polyisocyanate (b)"), and (c) a compound (hereinafter called "compound (c)") containing both of active hydrogen capable of reacting with the isocyanate group and a polymerizable unsaturated group.

The above polyether polyol (a) is a polyol possessing a polyoxyalkylene structure composed of a polyoxyalkylene group having 2–10 carbon atoms as a repetitive unit and is preferably a diol.

Given as examples of diols possessing the above polyoxyalkylene structure are polyglycol compounds such as polyethylene glycol, polypropylene glycol, polytetramethylene glycol, polyheptamethylene glycol, polyhexamethylene glycol, polydecamethylene glycol, and the like; and polyether diols obtained by ring-opening copolymerization of two or more ionic polymerizable cyclic compounds.

Examples of ion-polymerizable cyclic compounds include cyclic ethers such as ethylene oxide, propylene oxide, butene-1-oxide, isobutene oxide, 3,3-bischloromethyl oxetane, tetrahydrofuran, 2-methyl tetrahydrofuran, 3-methyl tetrahydrofuran, dioxane, trioxane, tetraoxane, cyclohexene oxide, styrene oxide, epichlorohydrin, glycidyl methacrylate, glycidyl acrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidyl benzoate, with cyclic ethers such as ethylene oxide and tetrahydrofuran.

Also, polyether diols produced by ring-opening copolymerization of the above ion-polymerizable cyclic compound and a cyclic imine such as ethylene imine or the like, a cyclic lactone such as p-propiolactone or glycolic acid lactide or the like, or cyclic siloxanes such as dimethylcyclopolysiloxane or the like can be used.

Examples of the specific combinations of two or more ion-polymerizable cyclic compounds include combinations of tetrahydrofuran and propylene oxide, tetrahydrofuran and 2-methyl tetrahydrofuran, tetrahydrofuran and 3-methyl tetrahydrofuran, tetrahydrofuran and ethylene oxide, and propylene oxide and ethylene oxide. Two or more ion-polymerizable cyclic compounds may be combined at random in the resulting ring-opening polymer.

The aforementioned diols having a polyoxyalkylene structure are commercially available under the trademarks, for example, PTMG1000, PTMG2000 (manufactured by Mitsubishi Chemical Corp.), PPG1000, PPG2000, EXCENOL2020, EXCENOL1020 (manufactured by Asahi Oline Co., Ltd.), PEG1000, Unisafe DC1000, Unisafe DC1800 (manufactured by Nippon Oil and Fats Co., Ltd.), PPTG2000, PPTG1000, PTG400, PTGL 2000 (manufactured by Hodogaya Chemical Co., Ltd.), and the like.

In the foregoing production, a diol having no polyoxyalkylene structure and/or a diamine may be used either individually or in combination with the polyether polyol (a). Here, as examples of a diol having no polyoxyalkylene structure, a polyester diol, polycaprolactone diol, polycarbonate diol, and the like are given. Examples of a polyester diol include polyester diols obtained by reacting polyhydric alcohol such as ethylene glycol, propylene glycol, tetramethylene glycol, 1,6-hexane diol, neopentyl glycol, or 1,4-cyclohexanedimethanol with a polybasic acid such as phthalic acid, isophthalic acid, terephthalic acid, maleic acid, fumaric acid, adipic acid, sebacic acid, or the like. Examples of a polycaprolactone diol include polycaprolactone diols obtained by reacting ε-caprolactone diol with a diol such as ethylene glycol, tetramethylene glycol, 1,6- hexane diol, neopentyl glycol, 1,4-butane diol, or the like. As examples of the polycarbonate diol, a polycarbonate diol of polytetrahydrofuran, polycarbonate of 1,6-hexane diol, and the like are given. These polycarbonate diols are commercially available under the trademarks DN-980, DN-981, DN-982, DN-983 (manufactured by Nippon Polyurethane Industry Co., Ltd.), PC-8000 (manufactured by PPG in US), and the like. Exemplary polyolefin diols include preferably linear or branched hydrocarbons containing a plurality of hydroxyl end groups. Preferably, the hydrocarbon is a non-aromatic compound containing a majority of methylene groups (—CH$_2$—) and which can contain internal unsaturation and/or pendent unsaturation. Fully saturated, for example, hydrogenated hydrocarbons, are preferred because the long term stability of the cured coating increases as the degree of unsaturation decreases. Examples of hydrocarbon diols include, for example, hydroxyl-terminated, fully or partially hydrogenated 1,2-polybutadiene; 1,4- and 1,2-polybutadiene copolymers, 1,2-polybutadiene-ethylene or -propylene copolymers, polyisobutylene polyol; mixtures thereof, and the like. Preferably, the hydrocarbon diol is a substantially hydrogenated or fully hydrogenated 1,2-polybutadiene or 1,2-polybutadiene-ethene copolymer.

The aforementioned polyisocyanate (b) is a compound containing 2–6 isocyanate groups with diisocyanates being preferred. Specific examples of the polyisocyanate (b) include 2,4-tolylene diisocyanate, 2,6-tolylene diisocyanate, 1,3-xylene diisocyanate, 1,4-xylene diisocyanate, 1,5-naphthalene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, hexamethylene diisocyanate, isophorone diisocyanate, dicyclohexyl-methane diisocyanate, methylenebis(4-cyclohexylisocyanate), hydrogenated diphenylmethane diisocyanate, 2,2,4-trimethylhexamethylene diisocyanate, bis (2-isocyanatoethyl) fumarate, 6-isopropyl-1,3-phenyl diisocyanate, 4-diphenylpropane diisocyanate, and lysine diisocyanate.

The above-noted compound (c) having an active hydrogen and a polymerizable unsaturated group, may include, for example, (meth)acryl type compounds having at least one hydroxyl group. Specific examples of the compound (c) include 2-hydroxyethyl (meth)acrylate, 2-hydroxypropyl (meth)acrylate, 2-hydroxyoctyl (meth)acrylate, pentaerythritol tri(meth)acrylate, glycerol di(meth)acrylate, dipentaerythritol monohydroxy penta(meth)acrylate, 1,4-butanediol mono(meth)acrylate, 4-hydroxycyclohexyl (meth)acrylate, 1,6-hexanediol mono(meth)acrylate, neopentyl glycol mono(meth)acrylate, trimethylolpropane di(meth)acrylate, trimethylolethane di(meth)acrylate, and (meth)acrylates represented by the following formulae (1) and (2):

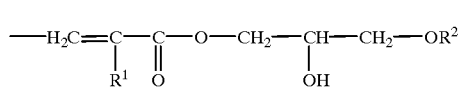

(1)

wherein

R$^1$ represents a hydrogen atom or a methyl group, and

R$^2$ represents a hydrogen atom or an alkyl, aryl, hydroxyalkyl, or hydroxyaryl group.

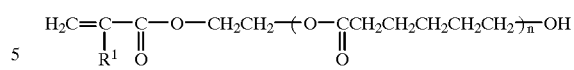

(2)

wherein R$^1$ is the same as defined above and n denotes an integer from 1 to 5. Among these groups, 2-hydroxylethyl (meth)acrylate is preferred.

Polymer (A) may be prepared by reacting at least one polyol (a) with at least one polyisocyanate (b) and at least one compound (c) in accordance with procedures and in proportions known for forming such reactions. As for the polymer (A) forming reaction of the polyether polyol (a) with the polyisocyanate (b) and the compound (c), for example, when a diol compound is reacted with a diisocyanate compound and a compound having an ethylenic unsaturated group, it is desirable to use a urethanization catalyst such as copper naphthanate, cobalt naphthanate, zinc naphthanate, dibutyltin dilaurate, triethyl amine, 1,4-diazabicyclo[2.2.2]octane, 2,6,7-trimethyl-1,4-diazabicyclo[2.2.2]octane, or the like in an amount of 0.01 to 1 part by weight of 100 parts of the total amount of reaction components. This reaction may be carried out at any suitable temperature, typically this reaction is performed at a temperature of 10 to 90° C., and preferably 30 to 80° C.

The oligomer which is the component (A) preferably contains a polyether polyol urethane-based polymer. The component (A) may either be composed entirely of polyether polyol urethane-based polymers or include polyether polyol urethane-based polymers as a major component as well as other polymers corresponding to the component (A). Examples of other oligomers suitable for use as component (A) include polyester polyol urethane-based oligomers, polycaprolactone polyol urethane-based oligomers, and the like.

The proportionate amount of the component (A) polymer in the composition of the present invention is generally from 25 to 75% by weight, and preferably from 40 to 70% by weight. If the proportion of the component (A) is too small, the elongation of the resulting cured product from the composition decreases, whereas if he proportion is too large, the viscosity of the composition increases, whereby the handling characteristics tend to be impaired.

Oligomer components can be selected to attain the optimal balance of properties for a given application demanded by the ultimate optical fiber cable manufacturer. The particular properties of interest in the present invention, however, are non-yellowing in particular and color stable in general, and the polyurethane acrylate oligomer should be tailored with this goal in mind. Additional disclosure about suitable components useful in conventional polyurethane synthesis can be found in, for example, *Polyurethane Handbook*, G. Oertel (Ed.), Hanser Publishers, 1985 (e.g., Chapter 2, "Chemical and Physical-Chernical Principles of Polyurethane Chemistry," and Chapter 3, "Raw Materials"), the complete disclosure of which is hereby incorporated by reference.

Although the aforementioned U.S. Pat. No. 5,336,563 is directed toward oligomers for inner primary coatings, the synthetic methods disclosed therein can also be used to prepare oligomers for outer primary coatings, inks, matrix materials, and other protective materials. Such coatings are disclosed in, for example, U.S. Pat. Nos. 4,522,465 and 4,514,037 to Bishop et al., the complete disclosures of which are hereby incorporated by reference. Also, U.S. Pat. No. 4,806,574 to Krajewski et al. discloses methods for tailoring the molecular architecture of the oligomer by, for example, use of polyfunctional cores. U.S. Pat. No. 5,093,386 to Bishop et al. and U.S. Pat. No. 4,992,524 to Coady et al., the disclosures of which are hereby incorporated by reference, disclose synthetic strategies for preparing radiation-curable oligomer for optical fiber coatings. Each of these references teach how to prepare suitable urethane ethylenically-unsaturated oligomers, in particular, urethane (meth)acrylate oligomers.

The number average molecular weight of the oligomer is not particularly limited but can be, for example, about 750–10,000 g/mol, and preferably, about 1,000–10 5,000 g/mole. Molecular weight can be selected to achieve the desired viscosity, modulus, solvent resistance, oxidative stability, and other important properties. Oligomer molecular weight and its distribution can be determined by gel permeation chromatography.

The oligomer can be present, relative to the total composition, in amounts between about 10 wt. % and about 90 wt. %, and preferably, between about 25 wt. % and about 80 wt. %, and more preferably, between about 45 wt. % and about 75 wt. %. The person skilled in the art can tailor the oligomer amount in view of the end requirements. Oligomer levels can be adjusted depending on the particular application.

(B) Transesterified and/or High-purity Monomer Diluent

Transesterified and/or high-purity monomer diluents include a wide variety of compounds having radiation-curable groups, such as the ethylenic-unsaturated groups noted herein above. Exemplary transesterified monomers include those which are esters of monocarboxylic acids, preferably (meth)acrylic acids, with alcohols and/or polyols, preferably 1,2- and 1,3-polyols that are formed by transesterification, for example in accordance with the techniques set forth in the Trapasso et aL patents noted-above.

High-purity monomer diluents include those monomers having a level of purity greater than 95%, preferably between 97% to 99.5% as measured by gas chromatography using an 11 meter RTx200 trifluoropropylmethyl polysiloxane column, with a flame ionization detector, an injection temperature of 200° C., and an initial column temperature of 90° C. for two minutes, followed by heating to 270° C. at a rate of 8° C. per minute and a detector temperature of 300° C. Suitable high-purity monomer diluents also include those monomers that are substantially free of polymerization inhibitors and reaction catalysts, in particular, monomer diluents having an organotin catalyst level of less than 100 ppm, more preferably, less than 10 ppm. Preferred high-purity monomer diluents suitable for use in the radiation-curable compositions of the present invention include those which have APHA (ASTM D-1209) color values of less than 40, more preferably less than 25. Particularly preferred high-purity monomer diluents include those which comply with two or more of the high-purity standards set forth (e.g., gas chromatography purity standard, the APHA standard and/or the substantially-free of polymerization inhibitor and reaction catalyst standard).

Especially preferred monomer diluents include those that are both transesterified and high-purity, referred to herein as "transesterified, high-purity monomer diluents". These transesterified, high-purity monomer diluents include those monomers which have been formed by transesterification and comply with one or more of the high-purity standards set forth above.

The transesterified and/or high-purity monomer diluent can be a conventional monomer or mixture of monomers having, for example, an acrylate functionality and a $C_4$–$C_{20}$ alkyl or polyether moiety. Particular examples of suitable monomer diluents include: isodecyl acrylate, isooctyl acrylate, hexylacrylate, 2-ethylhexylacrylate, isobornylacrylate, decyl-acrylate, laurylacrylate, stearylacrylate, 2-ethoxyethoxy-ethylacrylate, laurylvinylether, 2-ethylhexylvinyl ether, N-vinyl formamide, vinyl-caprolactam, N-vinylpyrrolidone, and the like.

Another type of transesterified and/or high-purity monomer diluents include those compounds having an aromatic group. Particular examples of monomer diluents having an aromatic group include:

phenoxyethylacrylate, ethoxylated nonylphenolacrylate, ethyleneglycolphenylether-acrylate, polyethyleneglycolphenyletheracrylate, polypropyleneglycolphenylether-acrylate, and alkyl-substituted phenyl derivatives of the above monomers, such as polyethyleneglycolnonylphenol-etheracrylate.

The transesterified and/or high-purity monomer diluent can also comprise a diluent having two or more functional groups capable of polymerization. Particular examples of such monomers include: ethoxylated bisphenol A diacrylate, $C_2$–$C_{18}$ hydrocarbon-dioldiacrylates, $C_3$–$C^{18}$ hydrocarbon triacrylates, and the polyether analogues thereof, and the like, such as 1,6-hexanedioldiacrylate, trimethylolpropane triacrylate, hexanedioldivinylether, triethylene-glycoldiacrylate, pentaerythritol-triacrylate, and tripropyleneglycol diacrylate. A particularly preferred monomer system useful in the present invention includes a system wherein at least 50 wt. %, preferably 70 wt. % and more preferably 95 wt. %, relative to the total pre-mixture monomers introduced into the compositions, are transesterified and/or high-purity monomers. In particular, the preferred monomer system will comprise at least one transesterified and/or high-purity monomer selected from the groups consisting of phenoxyethyl acrylate, isobornyl acrylate, isodecyl acrylate. The remainder of the monomer diluent system may comprise monomer diluents such as one or more of the types noted above which are not transesterified and not high-purity. Other preferred examples include those listed in the aforementioned U.S. Pat. No. 5,336,563. Additional examples include those listed in V.V. Krongauz and A.J. Tortorello, J. Appl. Polym. Sci., 57 (1995) 1627–1636. Transesterified and/or higb-purity monomer diluents such as ethoxylated bisphenol A diacrylate can be particularly useful for formulating outer primary coatings, inks and matrix materials. The person skilled in the art can tailor coating mechanical properties by selection of conventional diluents to prepare relatively soft or relatively hard coatings or other types of protective materials.

In many cases, mixtures of diluent compounds are needed to obtain optimal properties. Suitable diluents include, for example, (meth)acrylate compounds, although acrylate compounds are preferred.

The monomer diluent functions to decrease the viscosity of the oligomer and tailor the final coating properties like, for example, refractive index and polarity (moisture absorption). They also function to adjust the mechanical properties and crosslink density of the compositions and determine whether the compositions can serve as, for example, inner primary, outer primary, single coatings or matrix materials. Aromatic diluents like phenoxyethyl acrylate or ethoxylated nonylphenol acrylate tend to raise the refractive index of the material. Aliphatic diluents like lauryl acrylate impart hydrophobicity, and diluents with long chain alkyl groups also tend to soften the composition. Polar diluents like N-vinyl pyrollidone can improve room temperature mechanical properties by hydrogen bonding. Multifunctional diluents like trimethylolpropane triacrylate can increase cure speed and crosslink density. Formulations can be tailored with non-polar diluents to minimize water absorption because water generally has a detrimental impact on fiber. Preferably, the functional group present in the monomer diluent is capable of copolymerizing with the radiation-curable functional group present on the radiation-curable oligomer.

The diluent compound molecular weight is not particularly limited but is generally below about 1,000 g/mol. The oligomer diluent, however, may itself contain some oligomeric character such as repeating alkoxy groups like ethyleneoxy or propyleneoxy in an alkoxylated alkylphenol acrylate diluent.

The total amount of diluent is not particularly limited, but will be selected by the person skilled in the art to achieve the advantages of the present invention for a particular application. The total amount of diluent can be, for example, between about 10 wt. % and about 90 wt. %, and preferably, between about 20 wt. % and about 60 wt. %, and more preferably, between about 25 wt. % and about 50 wt. %.

After dilution of oligomer with diluent, the viscosity of the uncured composition is preferably less than about 12,000 mPa·s but greater than about 2,000 mPa·s, and preferably, between about 3,000 and about 8,000 mPa·s at 25° C. The viscosity is preferably stable over time so that long shelf life is attained. Many additives in optical fiber coatings can reduce shelf life, and additives are preferably selected to not interfere with shelf life.

(C) Additives

The present compositions can comprise conventional additives. Many different types of additives in optical fiber coatings are known, and the present invention is not particularly limited thereby. The additive should not unduly interfere with the effectiveness of the monomer diluent synthesized by transesterification of the present invention. Relevant disclosure concerning suitable additives is provided in, for example, the aforementioned U.S. Pat. Nos. 5,336,563, 5,093,386, 4,992,524, and 5,146,531. Possible additives include, but are not limited to silane adhesion promoters, photoinitiators, antioxidants, UV stabilizers, UV absorbers, slip agents and the like.

Photoinitiators are well-known in the art of optical fiber coatings to increase cure speed, and the selection of photoinitiator is not particularly limited. Conventional photoinitiators can be used. Mixtures of photoinitiators can often provide the optimal amount of surface and through cure. Commonly, there will be a trade-off between rapid cure speed and other desirable properties in the composition. The person skilled in the art can determine the optimal balance of properties. Use of photoinitiator is preferred, but yet optional because it is not required for electron beam cure. Rapid optical fiber production with UV-cure, however, requires photoinitiator.

The total amount of photoinitiator is not particularly limited but will be sufficient, for a given composition and application, to accelerate cure. The amount can be, for example, about 0.1 wt. % to about 10 wt. %, and preferably, about 0.5 wt. % to about 5 wt. %.

Suitable examples of photoinitiators include hydroxymethylphenylpropanone, dimethoxyphenylacetophenone, 2-methyl-1-[4-(methylthio)-phenyl]-2-morpholino-propanone-1,1-(4-isopropylphenyl)-2-hydroxy-2-methylpropan-1-one, 1-(4-dodecyl-phenyl)-2-hydroxy-2-methylpropan-1-one, diethoxyphenyl acetophenone, and the like. Phosphine oxide photoinitator types (e.g., Lucirin TPO by BASF) such as benzoyl diaryl phosphine oxide photoinitiators have become popular, particularly if pigments are present in the material. Mixtures of photoinitiators can be used. Non-yellowing photoinitiators can be used as discussed in, for example, U.S. Pat. No. 5,146,531, the complete disclosure of which is hereby incorporated by reference.

A preferred photoinitiator system for a primary coating is a mixture of 2-hydroxy-2-methyl-1-phenyl-1-propanone and bis(2,6-dimethoxybenzoyl)(2,4,4-trimethylpentyl) phosphine oxide. For outer primary coatings, inks and/or matrix materials, a preferred photoinitiator system is a mixture of diphenyl-(2,4,6-trimethylbenzoyl)phosphine oxide and 1-hydroxycyclohexylphenyl ketone. Suitable photoinitiators are also taught in the aforementioned U.S. Pat. No. 5,336,563.

Generally, additives can be present in amounts up to several percent. For example, conventional adhesion promoters such as organofunctional silanes can be used. These include acrylate, amino, or mercapto functional silanes. The amounts employed can be about 0.1–5 wt. %, and preferably, between about 0.3–3 wt. % for primary coatings to increase adhesion and retain adhesion despite exposure to moisture. Use of mercaptopropyl trimethoxy silane adhesion promoter in optical fiber coatings was first disclosed in U.S. Pat. No. 4,849,462 to Bishop, the complete disclosure of which is hereby incorporated by reference. Use of silanes was later claimed in, for example, U.S. Pat. No. 5,146,531, the complete disclosure of which is hereby fully incorporated by reference.

Shelf stabilizers also can be important additives as noted above. Butylated hydroxy toluene (BHT) is a commonly used stabilizing additive. Additives are also useful to tailor the handling characteristics of coated optical fiber. For example, slip agents and friction adjusting additives are useful. Still other additives or components which may appear in the final coating include pigments, light sensitive and light absorbing compounds, catalysts, initiators, lubricants, wetting agents, and leveling agents. These additives may be present in an effective amount that is usual for the additive when used in optical fiber coatings or protective materials. The person skilled in the art can design the use of such additives.

The radiation-curable compositions of the present invention may be formulated such that the composition after cure has a modulus as low as 0.1 MPa and as high as 2,000 MPa or more. Those having a modulus in the lower range, for instance, from 0.1 to 10 MPa, preferably 0.1 to 5 MPa, and more preferably 0.5 to less than 3 MPa are typically suitable for inner primary coatings for fiber optics. In contrast, suitable compositions for outer primary coatings, inks and matrix materials generally have a modulus of above 50 MPa, with outer primary coatings tending to have a modulus more particularly above 100 up to 1,000 MPa and matrix materials tending to be more particularly between about 50 MPa to about 200 Mpa. Elongation and tensile strengths of these materials can also be optimized depending on the design criteria for a particular use. For cured coatings formed from radiation-curable compositions formulated for use as an inner primary coating on optical fibers, the elongation is typically greater than 100 %, more preferably the elongation is at least 110%, more preferably 120%. Thermal mechanical measurements can be used to optimize the glass transition temperature (Tg) which may be from 10° C. down to −70° C. or lower for compositions formulated for use as inner primary coatings and 30° C. to 120° C. or higher, more preferably above 40° C., for compositions designed for use as outer primary coatings, inks and matrix materials.

The radiation-curable composition of the present invention which incorporate at least one transesterified and/or high-purity monomer provide cured materials that exhibit color stability. Preferred compositions include those wherein the cured material has a ΔE value of not greater than 25, more preferably not more than 20 and most preferably not more than 15, when exposed to low intensity fluorescent light for a period of 10 weeks. Several particular properties are desirable for the present compositions. The primary coating preferably has low water sensitivity and optimized adhesion for ribbon and loose-tube fiber assembly applications. Refractive index should be preferably at least about 1.48. The outer primary coating preferably has low hydrogen generation and is relatively haze free. Optical fibers will generally have a diameter of about 125 microns. Coating compositions can be, for example, used at thicknesses of 10–150 microns, and preferably, 20–60 microns.

The radiation-curable compositions of the present invention can be formulated for use as colored UV-curable ink compositions which are color stable. Thin layers of these inks can be coated onto the coated optical fiber to for identification purposes. UV-curable inks are discussed in, for example, "Ultraviolet Color Coding of Optical Fibers—a Comprehensive Study" by S. Vannais and J. Reese in *Wire Journal International*, October 1991, pgs. 71–76, the complete disclosure of which is hereby fully incorporated by reference. In addition, color change of UV-cured inks is discussed in the publication by D. Szum in *Polymers Paint Colour Journal*, Nov. 24, 1993, Vol. 183, pgs. 51–53, the complete disclosure of which is hereby incorporated by reference. Colored optical fiber materials are also disclosed in JP 64-22975 and JP-64-22976, the complete disclosures of which are hereby incorporated by reference.

The composition of the present invention can be formulated as a colored outer primary coating which comprises a monomer diluent synthesized by transesterification. The formulation of such coatings, absent the inclusion of at least one monomer diluent synthesized by transesterification of the present invention, is disclosed in WO 90/13579, the complete disclosure of which is hereby fully incorporated by reference. The compositions disclosed therein comprise pigment having particle size less than about one micron and acyl phosphine oxide photoinitiator. Conventional colorants, dyes, and pigments can be used having conventional colors. Pigments are preferred over dyes because dye color tends to fade with time. Colorants are preferably stable to ultraviolet radiation, and pigments are in the form of small particles. Particle size can be reduced by milling.

The colored material can comprise oligomers, at least one monomer diluent synthesized by transesterification, photoinitiators, and additives, as disclosed herein for substantially colorless coatings but adapted to be an ink binder, a colored outer primary coating, a colored matrix material, or the like.

Pigments can be conventional inorganic or organic pigments as disclosed in, for example, *Ullmann's Encyclopedia of Industrial Chemistry*, 5th Ed., Vol. A22, VCH Publishers (1993), pages 154–155, the complete disclosure of which is hereby fully incorporated by reference. The pigment can be selected based on, for example, whether the composition is an ink or an outer primary coating. Inks will be more heavily pigmented.

General classes of suitable colorants include, among others, inorganic white pigments; black pigments; iron oxides; chromium oxide greens; iron blue and chrome green; violet pigments; ultramarine pigments; blue, green, yellow, and brown metal combinations; lead chromates and lead molybdates; cadmium pigments; titanate pigments; pearlescent pigments; metallic pigments; monoazo pigments; diazo pigments; diazo condensation pigments; quinacridone pigments; dioxazine violet pigment; vat pigments; perylene pigments; thioindigo pigments; phthalocyanine pigments; and tetrachloroisoindolinones; azo dyes; anthraquinone dyes; xanthene dyes; and azine dyes.

More in particular, suitable inorganic pigments for inks include, for example, titanium dioxide, iron oxide, iron silicate, iron cyan blue (or Prussian blue), aluminum powder, cooper-zinc allow powder, and carbon black. Suitable organic pigments for inks include, for example, diarylide yellow, diarylide orange, naphthol AS red, Rubin 4 B calcium salt, salts of basic dyes, phthalocyanine blue, reflex blue, phthalocyanine green, and polycyclic pigments. Fluorescent pigments can be used.

Suitable pigments for an outer primary coating include titanium dioxide, carbon black (Degussa Special 4A or Columbian Raven 420), lamp black (General carbon LB#6), phthalo blue G (Sun 249–1282), phthalo blue R (Cookson BT698D), phthalo green B (Sun 264–0238), phthalo green Y (Mobay G5420), light chrome yellow (Cookson Y934D), diarylide yellow (Sun 274–3954), organic yellow (Hoechst H4 g), medium chrome yellow (Cookson Y969D), yellow oxide (Pfizer YLO2288D), lead-free-yellow (BASF Paliotol 1770), raw umber (Hoover 195), burnt umber (Lansco 3240X), lead free orange (Hoechst RL70), red oxide (Pfizer R2998D), moly orange (Cookson YL988D), arylide red (Hoechst F5RKA), quinacridone red (Ciba RT759D), quinacridone violet (Ciba RT887D), and the like.

The amount of the colorant, pigment, or dye is also conventional and will be determined by such factors as the shade, coloring strength, and fastness of the colorant as well as the dispersibility, Theological properties, and transparency. Also, inks are generally more heavily pigmented than outer primary coatings. The amount can be that which is sufficient to impart the required color, and more than that is not generally preferred. The amount of colorant can be, for example, between about 0 wt. % and about 25 wt. %, and preferably, about 0.25 wt. % and about 15 wt. %, and more preferably, between about 0.5 wt. % and about 5 wt. %.

A preferred type of ink composition is the Cablelite LTS UV-curable ink series commercially available from DSM Desotech, Inc. (Elgin, Ill.). Conventional fillers and extenders can be used with the colorants, pigments, and dyes.

The radiation-curable compositions discussed herein can readily be formulated for use in any one of several coating layers present in a ribbon assembly. These include the inner and outer primary coatings (which may or may not include coloring) on the optical fibers as well as other coatings including inks and matrix materials.

Ribbon assemblies comprising one or more coatings formed from a composition in accordance with the present invention can be advantageously used in various telecommunication systems. Such telecommunication systems typically include ribbon assemblies containing optical glass fibers, in combination with transmitters, receivers, and switches. The ribbon assemblies containing the coated optical glass fibers are the fundamental connecting units of telecommunication systems. The ribbon assembly can be buried under ground or water for long distance connections, such as between cities. The ribbon assembly can also be used to connect directly to residential homes.

The novel ribbon assembly made according to this invention can also be used in cable television systems. Such cable television systems typically include ribbon assemblies containing optical glass fibers, transmitters, receivers, and switches. The ribbon assemblies containing the coated optical glass fibers are the fundamental connecting units of such cable television systems. The ribbon assembly can be buried under ground or water for long distance connections, such as between cities. The ribbon assembly can also be used to connect directly to residential homes.

The novel ribbon assemblies can also be used in a wide variety of technologies, including but not limited to, various security systems, data transmission lines, high density television, and computer appliance systems. It will be appreciated that as a result of the fundamental discoveries described herein including the relationship between the fiber friction forces and the cohesive strength of the coatings themselves, and the means to control and establish such features and functions, the optical fiber art is now able to realize significant advantages. These are primarily exhibited, as explained above, in the stripping and cable splicing function, but those operations are nonetheless critical in the establishment of a ribbon/cable network of communication.

EXAMPLES

The following examples are given as particular embodiments of the invention and to demonstrate the practice and advantages thereof. It is understood that the examples are given by way of illustration and are not intended to limit the specification or the claims that follow in any manner.

Examples 1–3 and Comparative Examples A–B:

Radiation-curable coating compositions were prepared from the pre-mixture ingredients as shown in Tables 1–2. These compositions were tested and the properties of these compositions are also shown in Tables 1–2. In addition, the discoloration properties of these compositions were tested by exposure to a low intensity fluorescent light. Low intensity fluorescent aging was designed to more closely simulate long term actual storage conditions of coated optical fibers. Low intensity fluorescent aging of the test films was done prior to determining the degree of color change over different periods of time.

TABLE 1

| Components | Example 1 | Comparative Example A |
|---|---|---|
| Aliphatic Polyether Urethane Acrylate Oligomer | 65.40 | 65.40 |
| Phenoxyethyl Acrylate (Sartomer) | — | 20.00 |
| Transesterified, High-purity Phenoxyethyl Acrylate* (CPS) | 20.00 | — |
| Monofunctional Acrylate Diluent | 10.00 | 10.00 |
| Diphenyl (2,4,6-trimethylbenzoyl) phosphine oxide (LUCIRIN TPO) | 3.00 | 3.00 |
| IRGANOX 1035 (Ciba Geigy) | 0.50 | 0.50 |
| γ-mercaptopropyltrimethoxy silane | 1.00 | 1.00 |

TABLE 1-continued

| Components | Example 1 | Comparative Example A |
|---|---|---|
| Polyether modified dimethylpolysiloxane (BYK 333) | 0.1 | 0.1 |
| PROPERTIES | | |
| Viscosity (mPa · s) | 7770 | 7770 |
| Cure Speed (J/cm$^2$) | 0.65 | 0.67 |
| Tensile strength (MPa) | 1.00 | 0.8 |
| Elongation (%) | 186 | 153 |
| Modulus (MPa) | 1.40 | 1.4 |
| ΔE (low intensity fluorescent) @ week 7 | 14 | 31 |

Table Notes:
*CPS Chemical Company, Inc. specifies that this monomer has a minimum purity of 98% (as analyzed using the 11 meter RT × 200 column).

TABLE 2

| Components | Example 2 | Example 3 | Comparative Example B |
|---|---|---|---|
| Polyether-polycarbonate Aliphatic Urethane Acrylate Oligomer | 53.8 | 53.8 | 53.8 |
| Isodecyl Acrylate (Sartomer) | — | — | 16.2 |
| Transesterified, High-purity Isodecyl Acrylate* (CPS) | 16.2 | 16.2 | — |
| Transesterified, High-purity Phenoxyethl Acrylate* (CPS) | — | 25.5 | — |
| Monofunctional Acrylate Diluent | 25.5 | — | 25.5 |
| IRGACURE 1700 (Ciba Geigy) | 3.0 | 3.0 | 3.0 |
| IRGANOX 1035 (Ciba Geigy) | 0.5 | 0.5 | 0.5 |
| γ-mercaptopropyltrimethoxy silane | 1.0 | 1.0 | 1.0 |
| Properties | | | |
| Viscosity (mPa-s) | 5020 | 1650 | 3960 |
| Cure Speed (J/cm$^2$) | 0.47 | 0.66 | 0.47 |
| Tensile strength (MPa) | 0.6 | 0.5 | 0.4 |
| Elongation (%) | 126 | 131 | 91 |
| Modulus (MPa) | 0.9 | 1.1 | 0.9 |
| ΔE (low intensity fluorescent) @ week 10 | 11 | 8 | 22 |

Table Notes:
*CPS Chemical Company, Inc. specifies that these monomers have a minimum purity of 98% (as analyzed using the 11 meter RT × 200 column).

Test Procedures

Viscosity

Viscosity of the composition, prior to curing, was measured at 25° C. using a Physica MC10 with a Z3 Spindle @ Shear Rate of 50 s$^{-1}$ Cure Speed Cure speed in the present invention was measured as a function of fluorescent additive concentration with use of FTIR spectral analysis; the results being measured by relative absorbance units as a function of exposure time. Cure speed was determined by Dose vs. Modulus curve analysis of radiation-cured sample films of approximately 75 microns thickness which were cured at each of a series of doses (0.2, 0.3, 0.5, 0.75, 1.0, and 2.0 J/cm$^2$). Six specimens were cut from the center portion of each plate of the samples prepared. A Universal Testing Instrument, INSTRON Model 4201 equipped with a suitable personal computer and software "Series IX Materials Testing System" was used to measure the modulus of each specimen. The modulus measurements were then entered into the software package and the calculations were automatically performed with a determination of the average modulus for each film sample. The dose-modulus curve was then created by plotting the modulus values as a scatter plot and the above equation as a line.

The cure speed of the coating composition was determined to be the dose at which 95% of the ultimate secant modulus is attained.

Tensile Strength, Elongation and Modulus Test Method

The tensile strength, elongation and secant modulus of cured samples were tested using a universal testing instrument, Instron Model 4201 equipped with a personal computer and software "Series IX Materials Testing System." The load cells used were 4.4 Kg capacity. The ASTM D638M was followed, with the following modifications.

A drawdown of each material to be tested was made on glass plate and cured using a UV processor. The cured film was conditioned at 22 to 24° C. and 50±5% relative humidity for a minimum of sixteen hours prior to testing.

A minimum of eight test specimens, having a width of 12.7±0.005 mm and a length of 12.7 cm, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined. At least five measurements of film thickness were made in the area to be tested (from top to bottom) and the average value used for calculations. If any of the measured values of film thickness deviates from the average by more than 10% relative, the test specimen was discarded. All specimens came from the same plate.

The crosshead speed was set to 25.4 mm/min, and the crosshead action was set to "return at break". The crosshead was adjusted to 50.8 mm jaw separation. The air pressure for the pneumatic grips was turned on and set to approximately 1.5 Kg/cm².

After the Instron test instrument had been allowed to warm-up for fifteen minutes, it was calibrated and balanced following the manufacturer's operating procedures.

The temperature near the Instron instrument was measured and the humidity was measured at the location of the humidity gauge. This was done just before beginning measurement of the first test specimen.

Specimens were only analyzed if the temperature was within the range 23±1.0° C. and the relative humidity was within 50 ±5%. The temperature was verified as being within this range for each test specimen. The humidity value was verified only at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of tensile properties was performed automatically by the software package.

The values for tensile strength, % elongation, and secant, or segment, modulus were checked to determine whether any one of them deviated from the average enough to be an "outlier." If the modulus value was an outlier, it was discarded. If there were less than six data values for the tensile strength, then the entire data set was discarded and repeated using a new plate.

Delta E (ΔE) Over Time (low intensity fluorescent)

The ΔE value provides an indication of how stable the subject composition is and how it will hold-up over the years. The ΔE low intensity fluorescent test uses a three samples average, all measured on glass, prepared by curing a 500 microns thick radiation-curable composition of the present invention, formulated as an inner primary coating, on glass at 1.0 J/cm² under 0.2 m³/min of $N_2$. Then, a 75 microns thick standard outer primary coating was cured over the inner primary coating at the same conditions. Low intensity fluorescent light aging is done in a non-temperature-controlled room, under six eight foot long, 60 watt Phillips Econ-O-Watt fluorescent bulbs located approximately 3 meters from the samples.

Figure 2:
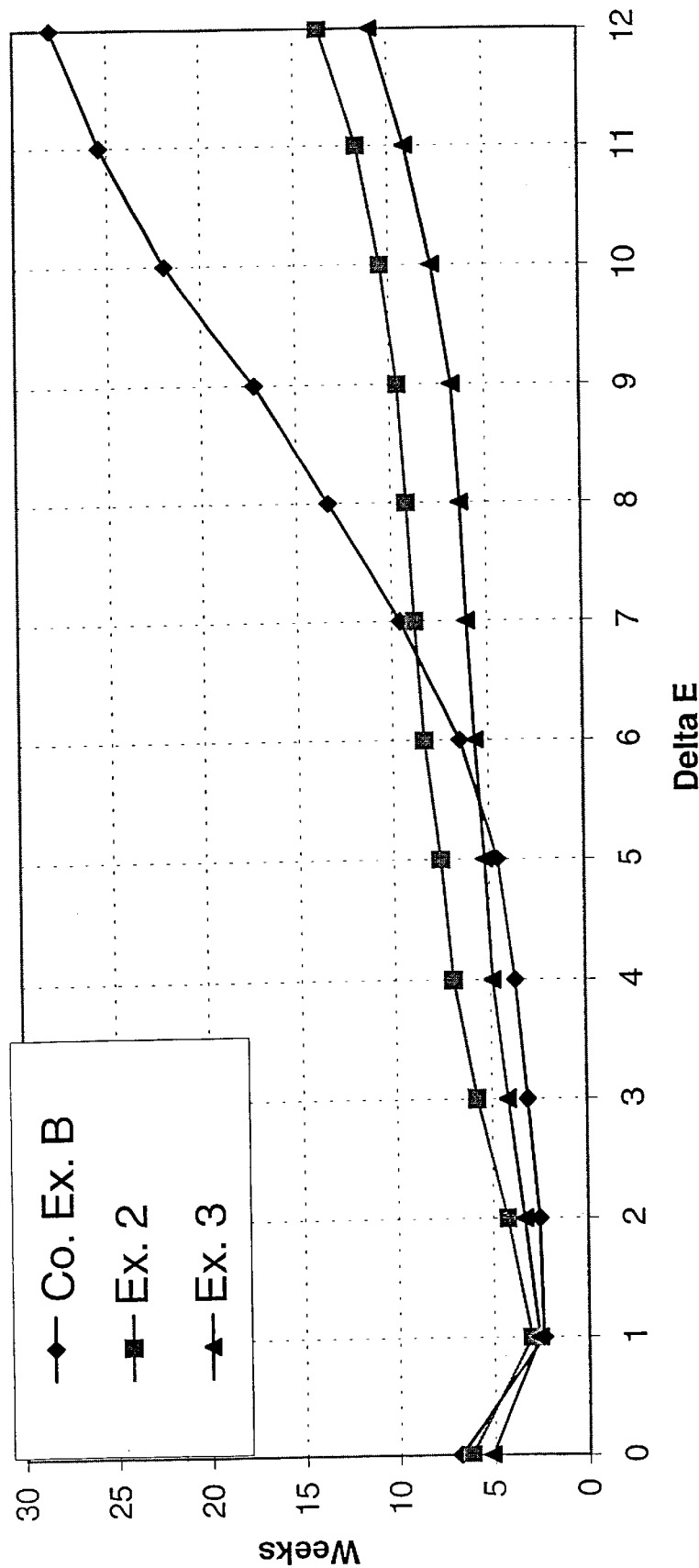
FIG. 2 depicts a comparison of $\Delta E$ values for Examples 2 and 3 and Comparative Example B over a 12 week period.

Weekly delta E (ΔE) values (degree of color change) were measured on a Mac Beth Color Eye 7000, calibrated with a standard white tile, serial #37009940696, samples were measured with a white background tile, serial #33073664. The measurements were taken in color difference mode, reflectance mode, observer menu set at 2 degrees, using the primary illuminant C. The results are presented on FIGS. 1 and 2.

While the invention has been described in detail and with reference to specific embodiments thereof, it will be apparent to those of ordinary skill in the art that various changes and modifications can be made therein without departing from the spirit and scope thereof.

What is claimed is:

1. A radiation-curable composition comprising:
   (i) a radiation-curable oligomer; and
   (ii) at least one transesterified monomer, said transesterified monomer having a purity level of greater than 95% and less than 100 ppm of an organotin catalyst;
   (iii) a silane adhesion promoter;
   wherein said composition upon cure has a ΔE value of less than 20 when exposed to low intensity fluorescent light for a period of ten weeks.

2. The radiation-curable composition according to claim 1, wherein said oligomer is a urethane (meth)acrylate oligomer.

3. The radiation-curable composition according to claim 2, wherein said urethane (meth)acrylate oligomer comprises at least one polyether, polycarbonate, hydrocarbon, or polyester group.

4. The radiation-curable composition according to claim 1, wherein said composition is a fiber optic coating composition.

5. The radiation-curable composition according to claim 1, wherein said composition is an inner primary optical fiber coating composition.

6. The radiation-curable composition according to claim 1, wherein said composition is an outer primary optical fiber coating composition.

7. A coated fiber optic comprising a cured coating formed from a composition according to claim 1.

8. A fiber optic ribbon assembly comprising a cured outer primary coating formed from a composition according to claim 1.

9. A fiber optic ribbon assembly comprising a cured colored outer primary coating formed from a composition according to claim 1.

10. A fiber optic ribbon assembly comprising a cured ink formed from a composition according to claim 1.

11. A fiber optic ribbon assembly comprising a cured matrix material formed from a composition according to claim 1.

12. The composition of claim 1, wherein said at least one monomer includes phenoxyethyl acrylate.

13. The composition of claim 1, wherein said silane adhesion promoter is a mercapto functional silane adhesion promoter.

14. The composition of claim 1, further comprising a mixture of photoinitiators.

15. The composition of claim 14, wherein said composition, after cure, has an elongation at break of at least 110%.

16. The composition of claim 1, wherein said at least one transesterified monomer has an APHA value of less than 40.

17. A radiation-curable composition comprising:
   (i) a radiation-curable oligomer; and
   (ii) at least one transesterified monomer having a purity level of greater than 95% and less than 100 ppm of an organotin catalyst, said at least one transesterified monomer being selected from the group consisting of isodecyl acrylate, isobornyl acrylate, and phenoxyethylacrylate;

wherein said composition upon cure has a ΔE value of less than 20 when exposed to low intensity fluorescent light for a period of ten weeks.

18. The composition of claim 17, wherein said composition, after cure, has a modulus of above 50 MPa.

19. The composition of claim 17, wherein said composition, after cure, has a modulus in the range of 0.1 to 10 MPa.

* * * * *

(12) INTER PARTES REVIEW CERTIFICATE (35th)
United States Patent
Snowwhite

(10) Number: US 6,323,255 K1
(45) Certificate Issued: Oct. 16, 2014

(54) RADIATION-CURABLE COMPOSITION

(75) Inventor: Paul E. Snowwhite

(73) Assignee: DSM IP Assets B.V.

Trial Number:
  IPR2013-00050 filed Nov. 15, 2012

Petitioner: Corning Incorporated

Patent Owner: DSM IP Assets BV

Inter Partes Review Certificate for:
  Patent No.: 6,323,255
  Issued: Nov. 27, 2001
  Appl. No.: 09/163,188
  Filed: Sep. 30, 1998

The results of IPR2013-00050 are reflected in this inter partes review certificate under 35 U.S.C. 318(b).

INTER PARTES REVIEW CERTIFICATE
U.S. Patent 6,323,255 K1
Trial No. IPR2013-00050
Certificate Issued Oct. 16, 2014

AS A RESULT OF THE INTER PARTES REVIEW PROCEEDING, IT HAS BEEN DETERMINED THAT:

Claims 1-19 are cancelled.

* * * * *